(12) United States Patent
Sheppard et al.

(10) Patent No.: US 9,367,213 B2
(45) Date of Patent: Jun. 14, 2016

(54) METHOD AND APPARATUS FOR DELIVERY OF INTERACTIVE MULTIMEDIA CONTENT OVER A NETWORK

(71) Applicant: Tangentix Limited, Sheffield, South Yorkshire (GB)

(72) Inventors: Paul Edmund Fleetwood Sheppard, Glasgow (GB); Edward Michael French, Holmfirth (GB); Peter Jack Jeffery, Sheffield (GB); Gareth Edward Lewis, Plymouth (GB)

(73) Assignee: Tangentix Limited, Sheffield (GB)

( * ) Notice: Subject to any disclaimer, the term of this patent is extended or adjusted under 35 U.S.C. 154(b) by 343 days.

(21) Appl. No.: 14/026,100

(22) Filed: Sep. 13, 2013

(65) Prior Publication Data

US 2014/0082532 A1     Mar. 20, 2014

(30) Foreign Application Priority Data

Sep. 14, 2012  (GB) .................................. 1216478.6
Mar. 25, 2013  (GB) .................................. 1305382.2

(51) Int. Cl.
*G06F 9/445*  (2006.01)
*G06F 3/0484*  (2013.01)
(Continued)

(52) U.S. Cl.
CPC .............. *G06F 3/0484* (2013.01); *A63F 13/10* (2013.01); *A63F 13/12* (2013.01); *A63F 2300/201* (2013.01); *A63F 2300/209* (2013.01); *A63F 2300/552* (2013.01); *A63F 2300/609* (2013.01)

(58) Field of Classification Search
CPC .............. G06F 8/60; G06F 8/70; G06F 8/71; G06F 3/0484
USPC .................................. 717/170–177; 709/203
See application file for complete search history.

(56) References Cited

U.S. PATENT DOCUMENTS 6,771,290 B1 *  8/2004  Hoyle ........................ G06F 8/60
                                                          715/745
6,889,363 B2 *  5/2005  Maloney ............... G06F 3/0481
                                                          600/425
(Continued)

FOREIGN PATENT DOCUMENTS

WO    2009030897 A2    3/2009
WO    2011/110855 A2    9/2011

OTHER PUBLICATIONS

Mecella et al, "Designing wrapper components for e-services in integrating heterogeneous systems", The VLDB Journal 10, pp. 2-15, 2001.*

(Continued)

*Primary Examiner* — Anil Khatri
(74) *Attorney, Agent, or Firm* — Coats & Bennett, P.L.L.C.

(57) ABSTRACT

A client device downloads an interactive multimedia content package, such as a video game, from a server across a network. The package includes executable code and a plurality of graphical asset files. A wrapper component is provided in the package, which provides an intermediate layer between the executable code and a runtime environment of the client device. The wrapper component restricts functionality of the interactive multimedia content package to provide a demonstration or trial mode, in particular having time limitations (e.g. a rental mode) or functional limitations regarding the assets and/or progress within the content by the executable code. The wrapper component may be removed or inactivated, thereby achieving a full or unlimited mode of the package.

19 Claims, 4 Drawing Sheets

(51) Int. Cl.
*A63F 13/40* (2014.01)
*A63F 13/30* (2014.01)

(56) References Cited

U.S. PATENT DOCUMENTS

| | | | | |
|---|---|---|---|---|
| 7,203,745 | B2* | 4/2007 | Sheehy | G06F 8/61 706/45 |
| 7,617,278 | B1* | 11/2009 | Edelman | H04L 65/4092 709/203 |
| 7,657,885 | B2* | 2/2010 | Anderson | G06F 8/65 705/59 |
| 7,694,293 | B2* | 4/2010 | Rao | G06F 8/65 713/191 |
| 7,698,383 | B2* | 4/2010 | Goring | G06F 9/546 709/203 |
| 8,028,096 | B2* | 9/2011 | Brune | H04M 1/72522 709/208 |
| 8,146,067 | B2* | 3/2012 | Eichenberger | G06F 8/4452 717/150 |
| 8,266,615 | B2* | 9/2012 | Shapiro | G06F 8/61 717/169 |
| 8,352,936 | B2* | 1/2013 | Chowdhury | G06F 8/40 717/177 |
| 8,407,682 | B2* | 3/2013 | Reisman | G06F 8/65 717/168 |
| 8,468,515 | B2* | 6/2013 | Chen | G06F 8/65 713/1 |
| 8,539,480 | B2* | 9/2013 | Malyshev | G06F 8/60 717/110 |
| 8,572,602 | B1* | 10/2013 | Colton | G06F 17/3089 709/220 |
| 8,788,569 | B2* | 7/2014 | Griffiths | G06F 9/5055 707/E17.055 |
| 8,893,117 | B2* | 11/2014 | Gaither | G06F 9/44526 705/59 |
| 8,898,668 | B1* | 11/2014 | Costea | G06F 9/45558 709/203 |
| 8,910,144 | B1* | 12/2014 | Joyce | G06F 9/45504 717/174 |
| 2008/0311985 | A1 | 12/2008 | Rajani et al. | |
| 2010/0056269 | A1 | 3/2010 | Zalewski | |
| 2011/0230256 | A1 | 9/2011 | Adra et al. | |

OTHER PUBLICATIONS

Mecella et al, "Designing wrapper components for e-services in integrating heterogeneous systems", The VLDB Journal 10: 2-15/ Digital Object Identifier (DOI) 10.1007/s007780100044, pp. 1-14, 2001.*

Li et al, "A Wrapper Generator for Wrapping High Performance Legacy Codes as Java/CORBA Components", IEEE, pp. 1-12, 2000.*

Spitznagel et al, "A Compositional Formalization of Connector Wrappers", IEEE, pp. 374-384, 2003.*

Kell, "Component Adaptation and Assembly Using Interface Relations", ACM, pp. 322-340, 2010.*

International Search Report, International Application No. PCT/GB2013/052406. Date of mailing: Mar. 21, 2014. European Patent Office, Rijswijk, Netherlands.

* cited by examiner

METHOD AND APPARATUS FOR DELIVERY OF INTERACTIVE MULTIMEDIA CONTENT OVER A NETWORK

RELATED APPLICATIONS

This application claims priority from foreign applications GB1216478.6 filed Sep. 14, 2012 in United Kingdom and GB1305382.2 filed Mar. 25, 2013 in United Kingdom, the disclosures of each of which are expressly incorporated herein by reference in their entirety.

BACKGROUND

1. Technical Field

The present invention relates generally to the field of methods and apparatus useful for delivering interactive multimedia content, such as video games, across a network.

2. Description of Related Art

In the related art, there is a growing demand for systems which allow interactive content, such as video games, to be delivered by downloading to a user device over a network. Further, there is a need to provide the user with a demonstration or trial of the content, in order to encourage the user to purchase and obtain the full version. Traditionally, one or more standalone demonstration version of a video game would be developed, packaged and distributed, separately from the full version. However, providing separate, standalone demonstration versions requires significant additional resources, which is costly and wasteful.

It is now desired to provide an apparatus and method which will address these, or other, limitations of the current art, as will be appreciated from the discussion and description herein.

SUMMARY OF THE INVENTION

According to the present invention there is provided a system, apparatus and method as set forth in the appended claims. Other features of the invention will be apparent from the dependent claims, and the description which follows.

In one example there is provided a client device, comprising: a hardware layer including at least a processor and a memory; a runtime environment which operates using the hardware layer; and an interactive multimedia content package including executable code and a plurality of graphical asset files, wherein the executable code executes using the runtime environment to provide an interactive virtual environment on the client device using the graphical asset files; wherein the interactive multimedia content package further comprises a wrapper component which provides an intermediate layer between the executable code and the runtime environment, and wherein the wrapper component restricts functionality of the interactive multimedia content package when in a demonstration or trial mode.

In one example there is provided a method of delivering interactive multimedia content across a network from a server apparatus to a client device, comprising: providing a content package at the server apparatus, wherein the content package includes executable code and graphical asset files for reproducing the interactive multimedia content on the client device; downloading the content package from the server apparatus to the client device across the network; and installing a wrapper component at the client device as an intermediary between the executable code and a runtime environment provided by the client device, wherein the wrapper component is configured to restrict functionality of the interactive multimedia content on the client device to provide a demonstration mode of the interactive multimedia content.

In one example there is provided a method for use in preparing interactive multimedia content, such as a video game, for delivery over a network, the method comprising: receiving a legacy content package comprising executable code and a plurality of graphical asset files; and adding a wrapper component to the legacy content package to produce a interactive multimedia content package ready to be downloaded at the server apparatus, wherein the wrapper component restricts functionality of the legacy game package to provide a demonstration mode of the legacy content on the client device.

In one example there is provided a method of monitoring an interactive virtual environment operating on a client device, comprising: obtaining one or more training images from the content under consideration; identifying trace artefacts in the training images which are indicative of a particular condition of interest in the content; and marking out one or more capture regions with respect to the identified artefacts of interest in the training images.

The method may further include taking one or more sample images from the content while operating on the client device; and examining the one or more capture regions from the sample images to determine whether or not the artefacts of interest are present in the sample images. In one example, the sample images are captured in use from a frame buffer of the client device. The method may include combining multiple regions and/or multiple artefacts together to give a corresponding test condition. The method may include performing a first test relating to a first region to identify a first artefact, and a second test relating to a second region to identify a second artefact; and outputting a positive test condition where both the first and second tests give positive results.

In one example there is provided a tangible non-transient computer readable medium having recorded thereon instructions which, when executed, cause a computer to perform the steps of any of the methods defined herein.

BRIEF DESCRIPTION OF THE DRAWINGS

For a better understanding of the invention, and to show how example embodiments may be carried into effect, reference will now be made to the accompanying drawings in which.

DETAILED DESCRIPTION OF THE EXAMPLE EMBODIMENTS

The example embodiments will be discussed particularly with reference to a gaming system, for ease of explanation and to give a detailed understanding of one particular area of interest. However, it will be appreciated that other specific implementations will also benefit from the principles and teachings herein. For example, the example embodiments can also be applied in relation to tools for entertainment, education, engineering, architectural design and emergency planning. Other examples include systems providing visualisations of the human or animal body for teaching, training or medical assistance. There are many specific environments which will benefit from delivering interactive multimedia content to client devices across a network with limitations as to use of that content. Thus, references to a game or video game are intended to refer to example uses of the teachings herein and should be adapted as appropriate for other example embodiments.

One example provides a system which allows graphically intensive multimedia content, such as video games, to be delivered across a network, and which allows a demonstration prior to the user obtaining and accessing a full version. The example system allows a video game package to be distributed over a network to a user device with a demo/trial mode, followed by a full or unlocked mode. Thus, the user may enjoy the demo mode and then, upon purchase, the full game is made available quickly and conveniently, as an unlocked mode.

In one example, a client device downloads an interactive multimedia content package, such as a video game, from a server across a network. The package includes executable code and a plurality of graphical asset files. A wrapper component is provided in the package, which provides an intermediate layer between the executable code and a runtime environment of the client device. The wrapper component restricts functionality of the interactive multimedia content package to provide a demonstration or trial mode, in particular having time limitations (e.g. a rental mode) or functional limitations regarding the assets and/or progress within the content by the executable code. The wrapper component may be removed or inactivated, thereby achieving a full or unlimited mode of the package.

One example allows active intervention while the restricted version is in use, within the game play, providing multiple opportunities for the user to unlock the full mode. The example embodiments have many advantages, including making efficient use of hardware resources, being easier and more intuitive for the user, and more convenient and effective for the content distributor.

As a further benefit, one example allows legacy games to be delivered whilst avoiding substantial modification or reengineering of the game code. As a result, legacy game code is more readily adapted into a digital online delivery channel, without adversely impacting the already tested and quality assured reliability of that game code. These legacy games can be quickly and easily packaged for delivery as a download over a network rather than, as may have been originally intended, requiring delivery by physical media such as an optical disc.

In one example there is provided a method and system wherein graphically intense interactive multimedia content, such as a video game, is delivered across a network from a server apparatus to a client device. The video game content is provided as a package ready to be downloaded. The package may include executable code and at least some graphical assets ready for playing the content on the client device. The package further comprises a download wrapper component. The client device installs the wrapper component as an intermediary between the executable game code and a runtime environment provided by the client device. The wrapper component restricts functionality of the content to provide a demonstration mode. The wrapper component may identify events in playing the content, such as by monitoring user inputs or screen outputs. In response to the identified events, the wrapper component may actively intervene in the playback, such as by offering opportunities for purchasing full or further access to the video game. In response to a purchase at the client device, the wrapper component may be deactivated, such as by being uninstalled from the client device. The restrictions imposed by the wrapper component are thus removed. The client device may then execute the game code on the runtime environment without interference by the wrapper component.

In one example, the wrapper component obtains and processes screen output images to identify predetermined artefacts in one or more regions of interest. The artefacts represent elements of interest, such as a colour or combination of colours used at a region of the screen image. The screen image may represent one video image frame or a snapshot of a visual screen output. The wrapper component uses the artefacts to monitor progress within the multimedia content and to trigger an appropriate intervention. As an example, the wrapper component monitors the content to determine a pause event where a natural break, such as a menu screen, is displayed when playing a video game. In response, the wrapper component may halt play and make an active intervention in the behaviour of the client device. For example, the wrapper component may cause a response screen or overlay to be displayed allowing the user to purchase the full version of the game. User inputs may be restricted, until the response screen has been completed, so that progress of the content is temporarily halted.

Figure 1:
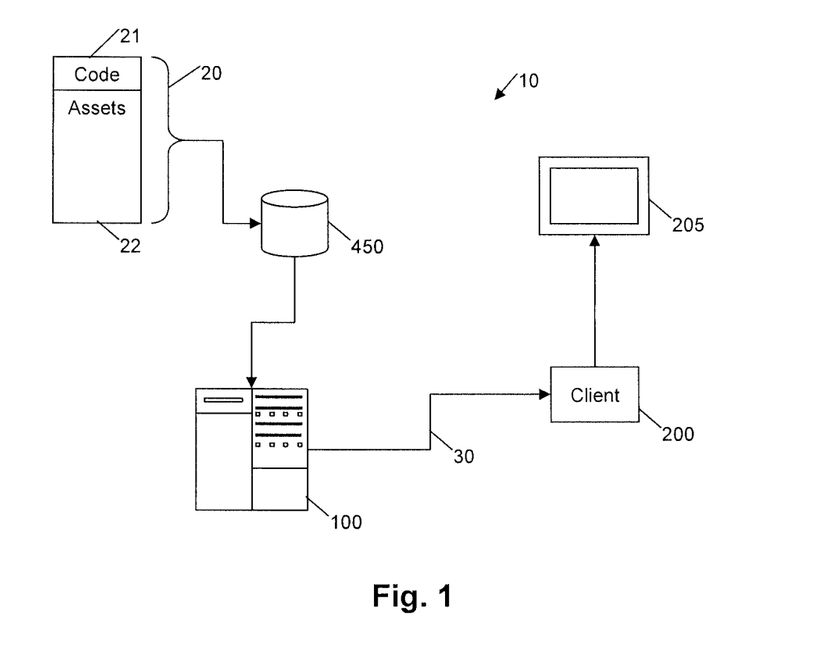
FIG. 1 is a schematic diagram of an example delivery system.

FIG. 1 is a schematic diagram of an example multimedia content delivery system 10 for delivering interactive graphical information, such as a video game, across a network 30. The example content delivery system includes at least one server device 100 and at least one client device 200 which are coupled together by the network 30. The underlying software and hardware components of the server device 100, the client device 200 and the network 30 may take any suitable form as will be familiar to those skilled in the art.

Typically, the server device 100 includes relatively powerful computers with high-capacity processors, memory, storage, etc. The client device 200 may take a variety of forms, including hand-held cellular phones, PDAs and gaming devices (e.g. Sony PSP™, Nintendo DS™, etc.), games consoles (XBOX™, Wii™ PlayStation™), set-top boxes for televisions, or general purpose computers in various formats (tablet, notebook, laptop, desktop). These diverse client platforms suitably provide local storage, memory and processing power, and contain or are associated with a form of visual display unit such as a display screen or other visual display device (e.g. LCD/LED monitor, touch screen, video goggles or holographic projector).

The network 30 is suitably a wide area network (WAN). The network 30 may include wired and/or wireless connections. The network 30 may include peer to peer networks, the Internet, cable or satellite TV broadcast networks, or cellular mobile communications networks, amongst others.

In an example embodiment, the server 100 and the client device 200 are arranged to deliver one or more content packages 20 across the network 30. In the following example, data flows flow substantially unidirectionally as a download from the server 100 to the client 200. In other specific implementations, it is possible that the packages are instead uploaded and transmitted from the client 200 to be received by the server 100. In still other examples, the packages are exchanged bidirectionally.

The content package 20, such as a video game, typically includes one or more sections of executable code 21, and a relatively large volume of data assets 22. In a video game, the assets 22 may include many multimedia game assets (i.e. 3D objects and related environmental data, video cut scenes, 2D image files and audio files). The code 21, and the assets 22, are typically designed and arranged to be delivered on an optical disc or other physical recording medium. Given the familiarity of the industry with the optical disc delivery format, it is also convenient to design and deliver new games in these traditional formats. In particular, issues such as quality assurance and security are well understood and highly developed for traditional games packages on physical media. Hence, it is advantageous to be able to maintain the current design and delivery process, but to add a simple and low-cost method for transferring the created original content into a form which is more suitable for digital downloads.

As a further consideration, there is also a large catalogue of legacy content, such as video games, which have already been created and distributed using optical discs or memory cartridges or other physical media. It is relatively difficult and expensive to change these legacy games retrospectively, and thus it is desired to provide a system which enables digital downloads of these games. Repackaging content into a downloadable form has many further advantages for the games industry, in particular to reach new customers or to reach new markets or territories.

In these example embodiments, the client device 200 executes the game code 21 to control an interactive virtual environment that will be represented visually through a display device 205 at the client device 200. The environment will depend upon the nature of the content, but a car racing game will typically provide a racetrack environment, while a first person role play game provides a city environment, as examples. The environment is virtual, in that it is produced within the hardware and appears on the display screen. The environment is interactive in that the user may command changes to the environment (e.g. move through virtual space by driving around a racetrack) and/or cause changes in behaviour within the environment (e.g. by fighting with other characters). The commands or actions of the user thus cause a response in the virtual environment, rather than the user being a passive observer.

Suitably, the server 100 downloads the game code 21 and the relevant game data 22 to the client 200. Executing the game code 21 causes the client device 200 to access the data assets 22 in relevant combinations, which then enables the client device 200 to output the appropriate visual representation on a display screen 205. In the example gaming system, these visual representations are then typically output in combination with a coordinated audio stream comprising background music and environmental audio (wind, rain), and more specific game-event related audio effects (gunshots, footfalls, engine noise). The interactive environment may be interspersed with previously prepared video sequences (cut scenes) and user interaction points (e.g. menus, maps).

Together, the executable code 21 and the assets 22 form part of the content package 20. A library device 450 may be provided to store the package 20 ready to be downloaded by the client device 200. The library 450 may store many different such game packages 20, giving the user a wide choice of games, or other content, to be downloaded.

Figure 2:
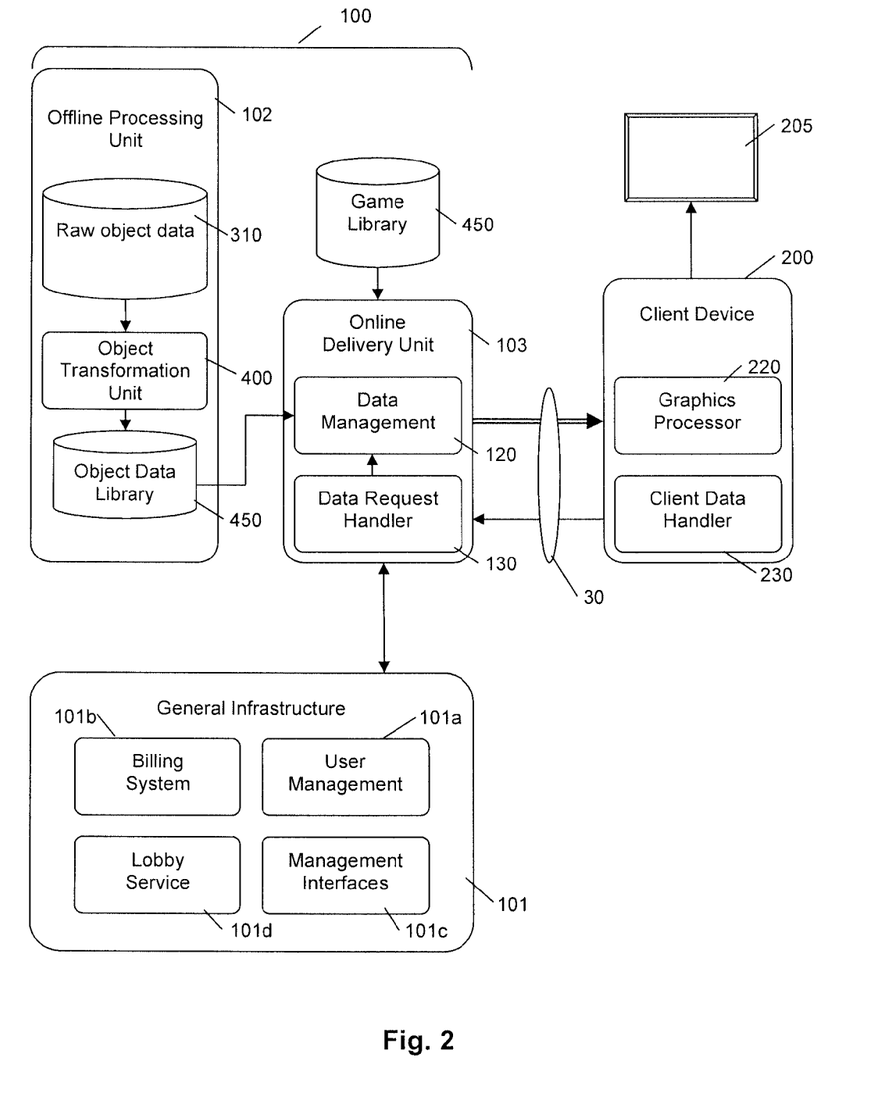
FIG. 2 is a schematic diagram showing the example delivery system in more detail.

FIG. 2 is a schematic diagram showing an example server apparatus 100 in more detail. In this example system architecture, the server 100 may include a general infrastructure unit 101, an offline processing unit 102, and an online delivery unit 103. Optionally, these units may be distributed amongst several physical server devices arranged at physically separate locations or sites. Also, these units may be duplicated or sub-divided according to the needs of a particular practical implementation.

The general infrastructure unit 101 provides support infrastructure to manage the content delivery process. For example, the general infrastructure unit 101 provides modules 101a-101d that manage user accounts including authentication and/or authorisation functions 101a, billing 101b, developer management interfaces 101c, and lobby services 101d that allow users to move around the system to access the available games or other multimedia content.

The online delivery unit 103 suitably includes a data management module 120 and a server-side data request handler 130. In the example gaming system, the data request handler 130 receives data requests from the client 200, such as a request for a particular content package 20. The data management module 120 handles the dispatch of the video game packages 20 from the library 450 to the client 200.

In the example embodiment, the client 200 includes, amongst other components, a graphics processor 220 and a client-side data handler 230. Here, the graphics processor 220 takes the 3D graphical data, received in the video game packages 20 from the server 200, or elsewhere, and performs relatively intensive graphical processing to render a sequence of visual image frames capable of being displayed on the visual output device coupled to the client 200. These frames may be 2D image frames, or 3D image frames, depending on the nature of the visual output device 205. The client-side data handler 230 connects with the server-side data request handler 130 to transfer the game packages 20 and optionally to exchange other data as well.

In one example, the server 100 holds the data assets 22 in their original format as might be provided by a games publisher for a traditional format appropriate to distribution on physical media such as optical disks. However, these original assets are relatively large and can take a long time to download over the network 30. Therefore, the example embodiments may further include an improved mechanism for changing the original assets into a compressed format. These compressed versions of the assets are then included in the downloadable package 20, and are decompressed by the client 200, i.e. from the compressed format back to the original format, ready to be called by the executing game code 21.

As shown in FIG. 2, the offline processing unit 102 includes an object transformation unit 400 that optionally and advantageously transforms the original assets, such as complex 3D objects, texture images, audio files and others, into their corresponding compressed format. The object transformation unit 400 suitably receives raw asset data 310 and converts or transforms the raw asset data into a transformed format, which can then be added as compressed game assets 22 to the respective download package 20 in the game library 450.

The asset transformation unit 400 suitably operates statically, in advance, so that a set of compressed assets becomes available in the transformed format. As one option, a games developer may supply raw assets 310, such as 3D objects, in a native high-resolution format such as a detailed polygon mesh. The raw assets 310 may also include texture files (image files) which provide surface texture and detail over the polygon meshes. These objects represent, for example, characters or components of the game such as humans, animals, creatures, weapons, tables, chairs, stairs, rocks, pathways, etc. The object transformation unit 400 then transforms the received objects into the compressed format and provides the compressed assets to be used later. A corresponding decompression unit may be provided at the client device 200, e.g. as part of the client-side data handler 230. The compressed assets are decompressed at the client device 200 and delivered in a suitable format to the graphics processor unit 220. Typically, the compressed assets are returned to their original format, but it is also possible to perform a format conversion. For example, an original bitmap image is compressed using partial differential equations (PDEs) into the compressed format, and a JPEG type image file is restored from the PDE compressed format, on the basis that the graphics processor 220 is able to accept the .jpg image file as a substitute for the original .bmp asset.

An example mechanism to compress assets using partial differential equations is discussed in detail in WO2011/110855 entitled MULTIMEDIA CONTENT DELIVERY SYSTEM, the entire content of which is incorporated herein by reference.

Figure 3:
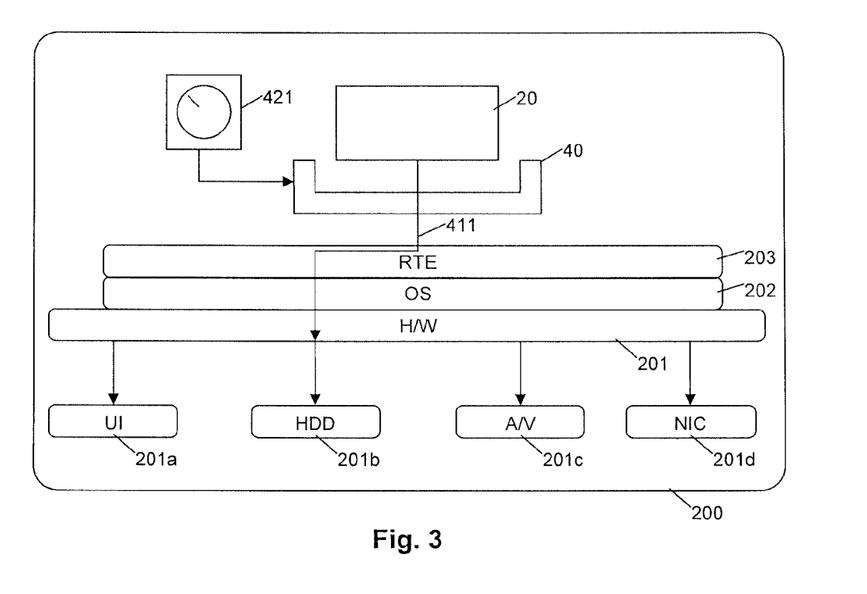
FIG. 3 is a schematic view showing a client device of the example delivery system in more detail.

FIG. 3 shows an example embodiment of the client device 200 in more detail. Here, the client device 200 includes physical hardware H/W 201, an operating system OS 202 and a runtime environment RTE 203. A content package 20 is downloaded from the server 100 in combination with a downloaded wrapper component 40. The wrapper component 40 provides an intermediate layer between the downloaded game package 20 and the runtime environment 203. In one example, the wrapper component may comprise executable software instructions which, when executed, control the client device 200 in the manner described herein.

The hardware layer 201 suitably includes user input devices 201a, such as keyboard, mouse, game pad etc, local storage devices 201b such as a hard disk drive HDD, audio/video A/V output devices 201c such as a sound card or video card to reach a monitor and speakers, and network interface connections NIC 201d to reach external network locations. The NIC 201d suitably allows the client device 200 to connect with the game delivery server 100 over the network 30.

During execution, the game package 20 will make system calls 411 through the runtime environment 203 via the operating system 202 to reach the physical hardware 201. The wrapper 40 suitably hooks one or more of these system calls 411, e.g. by hooking calls made through an application programming interface (API). As a result, the wrapper 40 is able to restrict the functionality of the downloaded game package 20. In one example, the wrapper may include one or more dynamic linked libraries (DLLs) which are installed on the client device. The DLLs may impose an intermediate layer between the executable code and the runtime environment 203, and particularly between the executable code and the operating system 202.

In the example embodiments, the wrapper 40 does not substantially interfere with playability of the game, by quickly and transparently passing legitimate calls 411 through to the OS 202 to reach the hardware layer 201. The legitimate system calls are calls of a type or nature which are to be ignored by the wrapper 40, or which the wrapper 40 has intercepted but determines not to intervene. The wrapper 40 enables a demo mode, or first mode of restricted functionality, wherein the user may experience and enjoy the interactive virtual environment provided by the content package 20 with limits or restrictions which are imposed by the wrapper 40. At a later point in time, the wrapper 40 may instead be changed so that the demo mode is instead changed to a full mode. In the full mode, the wrapper 40 removes the restrictions which applied in the demo mode, so that the user is now able to access more of the interactive environment than previously.

As shown in FIG. 3, the download wrapper 40 suitably includes one or more cut off controls 421 which impose restrictions by the wrapper 40 onto the game package 20. For example, the controls 421 define that the user is allowed to play the game package for a limited time period, such as 7 days or 30 days. In this way, the game content may be released to the client device with a rental system having a time restriction. As another example, the user is able to play the game in the demo mode a limited number of times, as a quantitive restriction. Many other specific implementations will be apparent to the skilled person, such as restricting the 'demo' mode to the first few levels of a multi-level game, restricting the user's choice of player character or locations in the game, and so forth. The wrapper 40 then implements these restrictions so that execution of the game package 20 is controlled.

In the example embodiment, the wrapper 40 controls any one or more of: file input/output, user inputs, screen activity and network activity, such that the functionality of the game is restricted for users who have not yet purchased the game. That is, in the demo mode, the wrapper 40 restricts the functionality of the downloaded game package 20, by restricting the ability of the executable code 21 to interact with the hardware of the client device 200.

In the example embodiment, the wrapper 40 may be completely uninstalled from the client device when the user purchases the full game, thus leaving the original game package 20 to run natively on the client device 200 without any further interference from the wrapper 40. That is, in the demo mode, the wrapper 40 actively interferes with the ability of the game package 20 to execute fully on the client device 200. Meanwhile, in the full mode, the wrapper 40 does not interfere at all, by becoming passive or inoperative, thus giving the game package 20 unfettered access to the client device 200.

Figure 4:
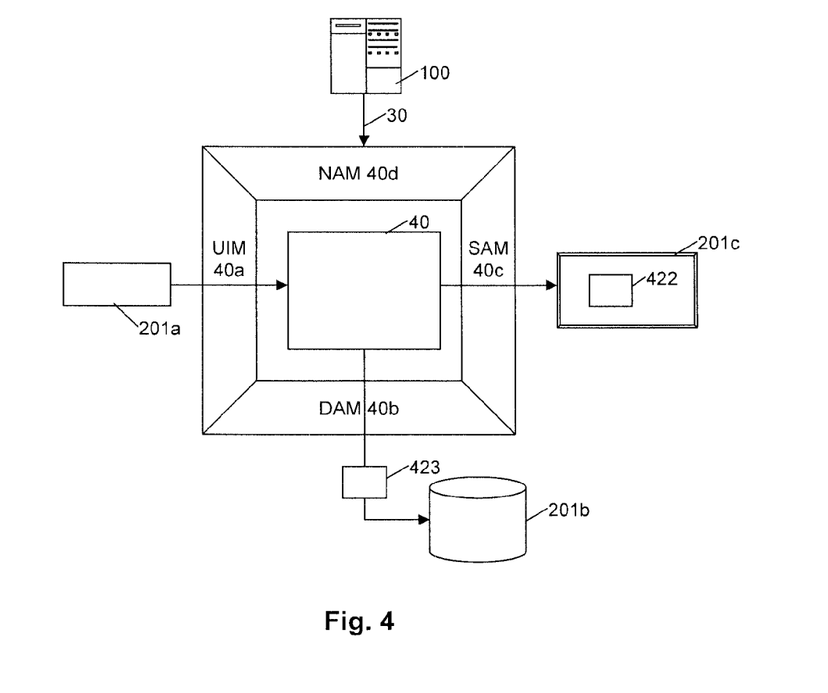
FIG. 4 is a schematic diagram showing an example delivery method and apparatus.

FIG. 4 is a schematic diagram showing the wrapper 40 in more detail. In this example, the wrapper 40 includes one or more of a user input module UIM 40a, a disc access module DAM 40b, a screen access module SAM 40c and a network access module NAM 40d.

The user input module UIM 40a intercepts input signals from the user input devices 201a. As noted above, the user input devices 201a suitably include any one or more of a keyboard, mouse, graphics pad, handheld-controller, touch sensor, motion sensor, face recognition unit, gesture recognition unit and so on. In use, the UIM 40a may intercept all, or some, of the user input signals at appropriate times during execution of the game code 21. As a result, the wrapper 40 is able to determine whether or not each user input signal is provided to the game code 21 by the execution environment 203. For example, the wrapper 40 may choose to disable an important key on a keypad (e.g. making the 'up' key unresponsive) thus controlling what the user is able to do with the game package 20. It will be appreciated that this ability to interfere with the user input signals provides a very effective mechanism to control the virtual environment in the demo mode. Many different specific implementations can be envisaged depending upon the nature of the content (e.g. what type of game is being played) and the desired effect on the user.

The disc access module DAM 40b restricts access to the local storage 201b. In the example embodiments, the DAM 40b may be arranged to satisfy demands for individual ones, or groups, of the game assets 22 as requested by the game code 21. For example, the wrapper 40 is thus able to examine a request by the game code 21 for a particular asset file name, and determine whether or not to allow the client device 200 to satisfy the request. In this way, the wrapper effectively controls access by the executing game code 21 to the relevant game assets 22. Again, this provided a powerful mechanism to interfere with the virtual environment as provided by the client device and to substantially affect the user's experience when the wrapper is active.

The DAM 40b of the wrapper 40 may further enable a dynamic asset streaming mechanism, wherein at least some of the game assets 22 are streamed to the client device 200 while the game is being played. Even though the game code 21 did not originally allow for asset streaming, this asset streaming function may be provided transparently by the wrapper 40 instead. Advantageously, the wrapper 40 interacts with the server 100 to receive a stream of the game assets 22 into a local asset cache, e.g. stored on the hard disk drive HDD 201b. A requested file is satisfied from the cache by the wrapper 40, rather than from an original local location as expected by the game code 21.

The DAM 40b also enables asset compression using alternate compression mechanisms. That is, the game assets 22 may be delivered in a highly compressed form and then decompressed prior to being provided to the game 20 via the DAM 40b.

The DAM 40b may also enable digital rights management, by restricting access from the game code 21 to one or more relevant game assets 22. For example, the DRM restricts access to graphic assets associated with particular player characters while in the demo mode. These assets are then unlocked in the full mode, such as by being transferred from a secure cache held by the wrapper 40 into the original storage location known to the game code 21 (e.g. by being copied into a directory associated with the game code 21).

The network access module NAM 40d intercepts and constrains network access by the game 20. Further the NAM 40d allows the wrapper 40 to access remote resources across the network 30. In particular, the example embodiments require continuous network access to the server 100 while in the demo mode and the NAM 40d monitors for presence of connection with the server 100. Suitably, the NAM 40d monitors a periodic 'heartbeat' signal which confirms validity of the connection. Where the connection is terminated (e.g. inactive for longer than a predetermined period), then the wrapper 40 may immediately terminate the demo session of this game. As another example, the NAM 40d restricts network access while in the demo mode so that the client device 200 is only able to access a defined set of network locations (e.g. a defined set of IP addresses).

The screen access module SAM 40c intercepts outputs from the game 20 toward one or more audio-video output devices 201c. For example, the SAM 40c intercepts a frame buffer which provides video signals via a video card. The game code 21 will typically write to the frame buffer with updated video information, thus allowing each frame of the video output to be displayed on the display screen. The wrapper 40 is suitably arranged to control the flow of information into or out of the frame buffer, thus restricting the ability of the game code 21 to display intended images to the display screen.

In the example embodiments, wrapper 40 is arranged to monitor a current status of the interactive virtual environment, in particular by considering these video output signals detected by the SAM 40c. In the example embodiments, the monitored video outputs allow the wrapper 40 to identify events or conditions during execution of the game where it is convenient to intercept the game and to actively take control of the client device for a period of time. That is, the interactive virtual environment is allowed to operate with a first set of restrictions in place for a first period of time, so that the user may experience the content in the demo mode. Then, upon reaching an appropriate condition in the game, it is desired to interrupt the game play and to enforce a second set of restrictions while in this interrupted condition. For example, the interruption may be used to require interaction from the user in a particular manner, such as completing a survey or viewing advertisements, or responding to an offer for the user to purchase full access to the content package in the full mode.

It has been noted that, in some practical examples, there is a difficulty in monitoring the current condition or status of the interactive virtual environment so that the wrapper is able to intervene at appropriate times.

For example, it is desired to interrupt execution of the content at times when the user might be receptive to the offer, and not to make the offer while the user is immersed in active game play or enjoyment of the content. That is, it is desired to distinguish between times or passages of play where the user is likely to be actively engrossed with the content, compared with times when the user is less actively engaged. For example, in a car racing game, it is desired to distinguish between the times when the user is actively driving, compared with times when the user has just finished a race or operates a menu screen.

In the example embodiments, the wrapper 40 is arranged to intercept signals incoming from the user input devices 201a and/or to intercept outgoing signals to the video devices 201c. In particular, the wrapper 40 examines at least one of these incoming and outgoing signals to detect a pause event of the game 20. It has been determined that a pause event in the game is an optimal time to intervene, such as for the purpose of making additional offers to the user.

In one example embodiment, the SAM 40c allows overlay presentations 422 to be added to the video output, thus presenting additional visible information on the screen 201c for the user. That is, a game pause event is detected and, in response, the wrapper 40 displays one or more overlay objects 422 on the display screen via the SAM 40c for the purpose of offering the full version of the game, for advertising other products, or otherwise, before game play can be resumed. The user input signals may be disabled or restricted by the UIM 40a while the offer is made.

The overlay objects 422 may be delivered from the server 100 across the network 30. The graphic messages may be derived from a profile of the player, e.g. built from prior game play or prior web activity. The graphic messages 422 include, for example, video sequences of the features in the full game, images of locations not yet reached in the full game, incentives to purchase, general advertising and so on.

In the example embodiments, the SAM 40c may capture images of level meters presented by the game 20 on screen as they pass through the SAM 40c. For example, pattern matching of graphical objects against predetermined images known to occur in this game allows the SAM 40c to determine a current game event, such as a game reaching a certain level or a player reaching a certain level status. The detected game events may then adjust the game profile, so that the delivered messages 422 and message timing can be adjusted accordingly.

In one example, the game code 21 may store one or more items of game progress information 423 onto the local storage 201b. The DAM 40b may observe the game progress information 423, analyse this information, and update the player profile accordingly, thus further tailoring the delivered messages 422.

The example embodiments allow the player profiles to be aggregated across a wide range of players, thus determining composite profiles which inform the likely purchase behaviour of a particular user at the particular device 200. Again, the delivered graphical messages 422 may be controlled by the wrapper 40 according to the composite user profiles.

The game progress information 423 may be diverted into a location controlled by the wrapper 40 and thus is only accessible via the wrapper 40. The game progress information 423 is thus rendered inoperative unless the wrapper 40 is present to permit further progress on the game. As another example, the game progress information 423 may be diverted by the DAM 40b and stored instead on the server 100, rather than in the local storage 201b, thus further enabling control by the wrapper 40. However, in the full mode, the game progress information 423 is instead made available locally on the client device 20 in the expected native format.

In the example embodiments, it is desired to monitor a condition of the interactive virtual environment and to identify appropriate moments, such as pause events, from examining the screen outputs of the code 21 to the display screen. Such a monitoring and intervention mechanism will now be described in more detail.

Sample images are obtained from the content under consideration. That is, the game code 21 is executed in a test environment on a test platform, and sample screen images are obtained. These sample images are suitably in bitmap format. The sample images can be obtained as screenshots. Notably, it is helpful to capture a particular game condition under differing screen environments, such as different aspect ratios or screen resolutions. Typically, the game code is configured to produce different screen outputs under these differing conditions, and the wrapper 40 thus ideally is trained to cope with each of the different expected screen configurations.

The sample images are examined to identify suitable trace elements or artefacts which are indicative of this particular moment or condition of interest in the content. The chosen artefacts may take any suitable form, and may uniquely identify the condition of interest compared with other conditions of the game.

One or more regions of capture are marked out with respect to the identified artefacts of interest in the sample images. In one example, the regions are regular rectangles which define regions of interest within the sample images where the artefacts appear. However, many games provide more complex screen images, often including three-dimensional components. Therefore, the regions may also be marked using polygons or an irregular polygon perimeter.

A capture approach is chosen depending upon the artefacts and regions of interest, so that information obtained from the sample images, or training images, can be compared against actual client images which are taken during reproduction of the content on the client device. These client images are captured in use by the SAM 40c, such as from the frame buffer, as noted above. Many different comparisons can be made between the sample images and the client images, and hence a capture approach is determined which gives preferential results for the condition of interest to be detected.

In one example, a bitmap comparison can be performed between the relevant sample image and the client image in the capture regions to determine whether or not the artefact is present. That is, a pixel-by-pixel comparison is made to determine whether corresponding pixel values exist, such as by comparing RGB values from each respective pixel.

In one example, the pixel comparison compares intensity values as a single channel rather than three-channel colour values (e.g. compare Y and ignore U, V) to reduce the comparison workload. In one example, pixel values are only counted when their colour or intensity value falls within a predetermined range. That is, the artefact of interest may have colours or intensity with signature values and thus a target range or target ranges may be established. Only pixels falling within the target ranges are compared. First and second ranges may be defined, representing two separate target colours or intensities. Conveniently, pixels in each range are counted. A percentage may be derived from each pixel count, such as a foreground colour count percentage, a background colour count percentage and a residual percentage. Where the percentage counts from the client image match with those from the sample image, then the condition of interest is identified. It has been found that a parametric measurement of the images in this way gives improved matching results.

Multiple tests can be combined together to give a corresponding test condition. For example, a first test looks at a first region to identify a first artefact, and a second test examines a second region to identify a second artefact. The test condition is positive where both the first and second tests give positive results. In one example, both of the first and second regions are provided within a same image frame. For example, the test looks for a particular foreground colour in a first region and looks for a particular pair of colours in a second region.

Suitably, these test conditions are recorded within the wrapper 40, so that the wrapper is now able to identify one or more conditions of interest within the screen images produced by the client device. Where a condition of interest is identified in use, the wrapper 40 may then intervene, such as by detecting that the interactive virtual environment is at a game pause event. If not, then the wrapper 40 can allow the user to continue enjoying the game in the demo mode. Thus, the wrapper 40 is better able to selectively allow the demo mode to continue until reaching a desired trigger condition, and then intervene to stop or otherwise change the behaviour of the environment as described above.

In a further example, the wrapper 40 is benchmarked or validated to confirm that the desired conditions are accurately identified on test-bed devices. This may require refinement and adaptation of the test conditions to improve positive identification of the desired game conditions. For example, it might be appropriate to select other artefacts instead and then to repeat the above steps in relation to the alternate artefacts, such as in order to reduce false positive results.

The test conditions may also need to be adapted to the specific screen configurations to be encountered. As noted above, there may be significant visual differences even for the same game when considering possible combinations of screen settings, such as screen resolution and screen aspect ratio.

Advantageously, the wrapper 40 allows legacy games, or games which are newly developed but presented in a legacy package format, to be downloaded and delivered across the network 30. The wrapper 40 constrains the downloaded game 20, thus allowing the user to experience a vivid demonstration of the game while maintaining comprehensive security. Upon purchasing the game, the user then has full access to maximise their enjoyment of the game.

As another advantage, the wrapper 40 allows advertisement content to be incorporated within a game or other content after publication. That is, the overlays 423 may carry advertisement information even in a full mode of the game. The wrapper identifies appropriate times during play where the advertisement content can be output (e.g. by being added to the visual display screen).

In another example, the wrapper 40 can be used to improve localisation of the content. For example, the wrapper can be used to add subtitle images which are synchronised with the content at appropriate points, by monitoring progress of the content as described above.

Figure 5:
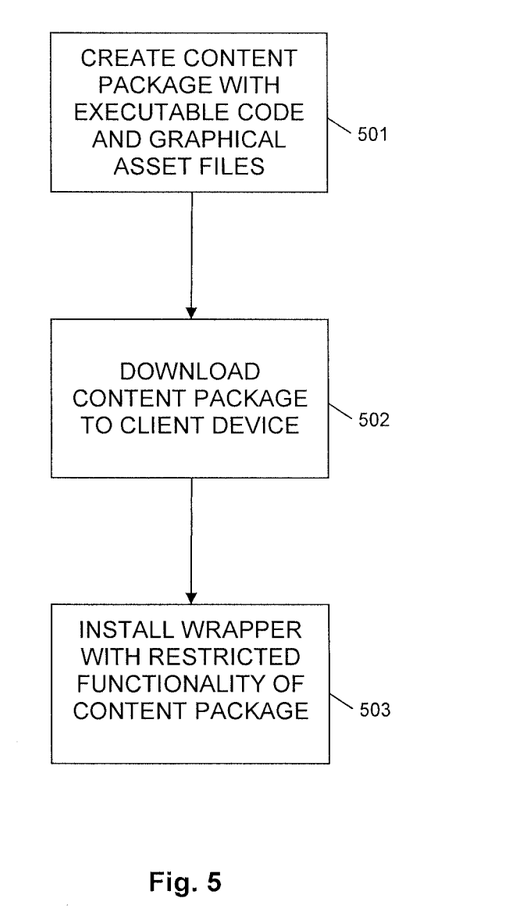
FIG. 5 is a schematic flow diagram showing an example content delivery method.

FIG. 5 is a flowchart showing an example method of delivering interactive multimedia content across a network from a server apparatus 100 to a client device 200, as also discussed above. The step 501 may include providing a content package at the server apparatus, wherein the content package includes executable code and graphical asset files for reproducing the interactive multimedia content on the client device. The step 502 may include downloading the content package from the server apparatus 100 to the client device 200 across the network. The step 503 may include installing the wrapper 40 at the client device 200 as an intermediary between the executable code and a runtime environment provided by the client device, wherein the wrapper 40 is configured to restrict functionality of the interactive multimedia content on the client device to provide a demonstration mode of the interactive multimedia content. Other features and examples of the method have already been discussed above and need not be repeated here.

The invention as described herein may be industrially applied in a number of fields, including particularly the field of delivering video games across a network from a server device to a client device.

The example embodiments have many advantages and address one or more problems of the art as described above. In particular, the example embodiments address the problem of providing demo versions of a full game onto a client device, which are particularly relevant with video gaming environments. The example embodiments address piracy and security issues.

At least some of the example embodiments may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks.

Elements of the example embodiments may be configured to reside on an addressable storage medium and be configured to execute on one or more processors. That is, some of the example embodiments may be implemented in the form of a computer-readable storage medium having recorded thereon instructions that are, in use, executed by a computer system. The medium may take any suitable form but examples include solid-state memory devices (ROM, RAM, EPROM, EEPROM, etc.), optical discs (e.g. Compact Discs, DVDs, Blu-Ray discs and others), magnetic discs, magnetic tapes and magneto-optic storage devices.

In some cases the medium is distributed over a plurality of separate computing devices that are coupled by a suitable communications network, such as a wired network or wireless network. Thus, functional elements of the invention may in some embodiments include, by way of example, components such as software components, object-oriented software components, class components and task components, processes, functions, attributes, procedures, subroutines, segments of program code, drivers, firmware, microcode, circuitry, data, databases, data structures, tables, arrays, and variables.

Further, although the example embodiments have been described with reference to the components, modules and units discussed herein, such functional elements may be combined into fewer elements or separated into additional elements.

Although a few example embodiments have been shown and described, it will be appreciated by those skilled in the art that various changes and modifications might be made without departing from the scope of the invention, as defined in the appended claims.

We claim:

1. A client device, comprising:
a hardware layer including at least a processor and a memory;
a runtime environment which operates using the hardware layer; and
an interactive multimedia content package including executable code and a plurality of graphical asset files, wherein the executable code executes using the runtime environment to provide an interactive virtual environment on the client device using the graphical asset files;
wherein the interactive multimedia content package further comprises a wrapper component which provides an intermediate layer between the executable code and the runtime environment, and wherein the wrapper component restricts functionality of the interactive multimedia content package when in a demonstration or trial mode;
wherein the wrapper component is configured to identify an event during user interaction with the interactive multimedia content package.

2. The client device of claim 1, wherein the wrapper component is configured to identify an event during user interaction with the interactive multimedia content package by monitoring screen outputs by a video output component of the client device.

3. The client device of claim 1 wherein the wrapper component is configured to identify the event during user interaction with the interactive multimedia content package by monitoring user inputs by one or more user input devices of the client device.

4. The client device of claim 1, wherein the wrapper component is configured to determine that a pause event has occurred in the interactive multimedia content package.

5. The client device of claim 1, wherein the wrapper component is configured to constrain user inputs from one or more user input devices related to the interactive multimedia content package.

6. The client device of claim 1, wherein the wrapper component, in response to identifying the event, is configured to display an overlay object over a visual output of the interactive multimedia content package and to restrict user inputs to a predetermined set of actions at least while the overlay object is displayed.

7. The client device of claim 6, wherein the client device is configured to receive the overlay object from a server apparatus across a network.

8. The client device of claim 7, wherein the overlay object is selected according to a profile of prior activity by the user.

9. The client device of claim 1, wherein the executable code is configured to make system calls through the runtime environment to operate one or more components in the hardware layer, and the wrapper component is configured to restrict functionality of the executable code by hooking one or more of the system calls.

10. The client device of claim 1, wherein the wrapper component is configured to restrict access to a local storage device, including restricting access by the executable code to one or more of the graphical asset files stored on the local storage device.

11. The client device of claim 1, wherein the wrapper component is configured to capture image regions from video output signals though a video output component of the client device during user interaction with the interactive multimedia content, package, and to determine a current event by examining the captured image regions.

12. The client device of claim 1, wherein the wrapper component is configured to intercept and constrain network access by the executable code using a network interface device within the client device.

13. The client device of claim 12, wherein the wrapper component is configured to monitor continuity of a connection across a network to a server apparatus at least while in the demonstration mode and, where the connection is determined to be discontinued, then to terminate a current session of the interactive multimedia content package on the client device.

14. A method of delivering interactive multimedia content across a network from a server apparatus to a client device, comprising: providing a content package at the server apparatus,
   wherein the content package includes executable code and graphical asset files for reproducing the interactive multimedia content on the client device;
   downloading the content package from the server apparatus to the client device across the network; and
   installing a wrapper component at the client device as an intermediary between the executable code and a runtime environment provided by the client device,
   wherein the wrapper component is configured to restrict functionality of the interactive multimedia content on the client device to provide a demonstration mode of the interactive multimedia content; and
   to identify events during user interaction with the multimedia contents.

15. The method of claim 14, wherein the wrapper component identifies events during user interaction with the interactive multimedia content by at least one of: monitoring user inputs to the client device, and monitoring screen outputs of the client device.

16. The method of claim 15, wherein the wrapper component, in response to identifying the events, is configured to display an overlay screen over a visual output of the interactive media content and to restrict user inputs to a predetermined set of actions at least while the overlay screen is displayed.

17. The method of claim 16, further comprising causing the wrapper component to be inoperative on the client device in order to provide a full access mode of the interactive multimedia content on the client device.

18. The method of claim 14, wherein the executable code controls an interactive virtual environment on the client device which is represented using the graphical asset files.

19. The method of claim 14, further comprising:
   receiving a legacy content package comprising the executable code and a plurality of the graphical asset files; and
   adding the wrapper component to the legacy content package to produce the interactive multimedia content ready to be downloaded from the server apparatus, wherein the wrapper component restricts functionality of the legacy content package to provide a demonstration or trial mode of the legacy content on the client device.

* * * * *